(12) United States Patent
Rosenbaum et al.

(10) Patent No.: US 12,399,711 B2
(45) Date of Patent: *Aug. 26, 2025

(54) AUTOMATIC GENERATION OF DOCUMENTATION USING CODING PATTERNS

(71) Applicant: S.T. Swimm Tech Ltd, Tel-Aviv (IL)

(72) Inventors: Omer Rosenbaum, Tel-Aviv (IL); Saar Raz, Tel-Aviv (IL); Oren Toledano, Jerusalem (IL); Tom Ahi-Dror, Ramat Gan (IL); Gilad Navot, Tel-Aviv (IL)

(73) Assignee: S.T. Swimm Tech Ltd, Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,057

(22) Filed: Jul. 1, 2024

(65) Prior Publication Data

US 2024/0354104 A1 Oct. 24, 2024

Related U.S. Application Data

(63) Continuation of application No. 17/968,879, filed on Oct. 19, 2022, now Pat. No. 12,050,909.

(51) Int. Cl.
*G06F 8/73* (2018.01)
*G06F 16/23* (2019.01)
(Continued)

(52) U.S. Cl.
CPC ............ *G06F 8/73* (2013.01); *G06F 16/2365* (2019.01); *G06F 16/84* (2019.01);
(Continued)

(58) Field of Classification Search
CPC .... G06F 16/2365; G06F 8/73; G06F 16/3331; G06F 16/94; G06F 21/6209; G06F 30/226; G06F 8/77; G06F 16/84; H04L 67/10
See application file for complete search history.

(56) References Cited

U.S. PATENT DOCUMENTS 11,334,692 B2    5/2022   Farrell
12,050,909 B2 *  7/2024   Rosenbaum ............. G06F 8/73
(Continued)

OTHER PUBLICATIONS

Notice of Allowance Dated Apr. 5, 2024 from the US Patent and Trademark Office Re. U.S. Appl. No. 17/968,879. (11 pages).
(Continued)

*Primary Examiner* — Tuan A Vu

(57) ABSTRACT

A method for generating documentation text comprises: extracting, from a plurality of source files of a software program, a plurality of element identifiers, each identifying an element of the software program; selecting a set of selected element identifiers of the plurality of element identifiers according to a plurality of scores, each score computed for an element identifier of the plurality of element identifiers; and for each of the set of selected element identifiers: generating an element documentation text using a documentation template and a plurality of patterns identified in a plurality of usage instances where in each of the plurality of usage instances the selected element identifier exists in at least one of the plurality of source files; and adding the element documentation text to a repository of documentation text associated with the plurality of source files.

22 Claims, 10 Drawing Sheets

(51) Int. Cl.
  *G06F 16/84* (2019.01)
  *G06F 16/3331* (2025.01)
  *G06F 16/93* (2019.01)
  *G06F 21/62* (2013.01)
  *G06V 30/226* (2022.01)
  *H04L 67/10* (2022.01)

(52) U.S. Cl.
  CPC .......... *G06F 16/3331* (2019.01); *G06F 16/94* (2019.01); *G06F 21/6209* (2013.01); *G06V 30/226* (2022.01); *H04L 67/10* (2013.01)

(56) References Cited

U.S. PATENT DOCUMENTS

| | | | |
|---|---|---|---|
| 2003/0179228 A1* | 9/2003 | Schreiber | G06F 16/84 |
| | | | 707/E17.058 |
| 2008/0275910 A1* | 11/2008 | Molina-Moreno | ............................ |
| | | | G06F 16/2365 |
| 2011/0093471 A1 | 4/2011 | Brockway | |
| 2014/0013304 A1 | 1/2014 | Vangala et al. | |
| 2015/0227590 A1 | 8/2015 | Nissen | |
| 2017/0075798 A1 | 3/2017 | Lau | |
| 2017/0147709 A1* | 5/2017 | Ganz | H04L 67/10 |
| 2020/0210648 A1 | 7/2020 | Comeau et al. | |
| 2022/0319219 A1 | 10/2022 | Tsibulevskiy et al. | |
| 2024/0134639 A1 | 4/2024 | Rosenbaum et al. | |

OTHER PUBLICATIONS

Supplementary European Search Report and the European Search Opinion Dated Feb. 9, 2024 From the European Patent Office Re. Application No. 23204445.3. (7 Pages).

Communication Pursuant to Article 94(3) EPC Dated Mar. 18, 2025 From the European Patent Office Re. Application No. 23204445.3 (4 Pages).

* cited by examiner

AUTOMATIC GENERATION OF DOCUMENTATION USING CODING PATTERNS

RELATED APPLICATION/S

This application is a Continuation of U.S. patent application Ser. No. 17/968,879 filed on Oct. 19, 2022. The contents of the above applications are all incorporated by reference as if fully set forth herein in their entirety.

FIELD AND BACKGROUND OF THE INVENTION

Some embodiments described in the present disclosure relate to creation of documentation and, more specifically, but not exclusively, to creating documentation of software code.

Entity documentation is text that accompanies an entity and provides information about the entity. Such information may include a description of the entity, information about using the entity, information about how to create the entity, information about how the entity works, information about how the entity is implemented or any combination thereof.

In the field of software development, code documentation is text that accompanies software code and provides information about the software code. Such information may include, but is not limited to, what the software code does, how the software code does what it does, motivation behind what the code does or how it is done, how to use the software code, or any combination thereof. Code documentation is a means of preserving knowledge that is available at the time of writing the code and which may be forgotten over time, as well as a means of sharing knowledge about the code between multiple software developers or between software developers and other people, for example other employees working with the software developers. Knowledge about the code may include information that is not reflected in the code itself, for example information about a decision to not implement a feature. It is commonly recognized that when software code is well documented it is easier to share the software code among multiple software developers, particularly new members of a development team. Additionally, or alternatively, it is easier to maintain the software code over time when the software code is well documented.

It is a known practice for software developers, while writing code for a software program, to add comments inside the code that are ignored by compilers and processors and that describe some elements of the software program, for example the meaning of a particular variable or a particular method. However, not all software developers write sufficient documentation in their code, either because they do not see value in additional documentation or because they fail to devote the required time to such a task. In addition, such comments usually provide information local to a particular part of the software program and usually do not cover more general aspects of the software program, for example structure of the software program's source files or how to add a new element to the software program. Such information is usually provided in documentation that is external to the code.

SUMMARY OF THE INVENTION

It is an object of some embodiments described in the present disclosure to provide a system and a method for generating documentation text using coding patterns identified in a plurality of source files of a software program. In some embodiments described herewithin, a plurality of element identifiers are extracted from a plurality of source files of a software program. In such embodiments, for each selected element identifier selected for documentation from the plurality of element identifiers, an element documentation text is generated using a documentation template and a plurality of patterns identified in a plurality of usage instances of the selected element identifier in the plurality of source files.

The foregoing and other objects are achieved by the features of the independent claims. Further implementation forms are apparent from the dependent claims, the description and the figures.

According to a first aspect, a method for generating documentation text comprises: extracting, from a plurality of source files of a software program, a plurality of element identifiers, each identifying an element of the software program; selecting a set of selected element identifiers of the plurality of element identifiers according to a plurality of scores, each score computed for an element identifier of the plurality of element identifiers using at least one of: an amount of connections in the plurality of source files between the element identifier and the plurality of element identifiers, and an amount of appearances of the element identifier in the plurality of source files; and for each selected element identifier of the set of selected element identifiers: generating an element documentation text using a documentation template and a plurality of patterns identified in a plurality of usage instances where in each of the plurality of usage instances the selected element identifier exists in at least one of the plurality of source files; and adding the element documentation text to a repository of documentation text associated with the plurality of source files. Selecting a set of element identifiers to document according to a plurality of scores increases accuracy of the set of element identifiers, increasing the likelihood that the set of element identifiers identifies significant elements of the software program. Using one or more statistical values that are indicative of one or more appearances of the element identifier in the plurality of source files to compute the score increases accuracy of the score as an indicator of a degree of significance of documenting the element identifier and thus increases usability of the created documentation. Using a documentation template allows control of what text is included in the element documentation text, increasing usability of the element documentation text.

According to a second aspect, a system for generating documentation text comprises at least one hardware processor configured for: extracting, from a plurality of source files of a software program, a plurality of element identifiers, each identifying an element of the software program; selecting a set of selected element identifiers of the plurality of element identifiers according to a plurality of scores, each score computed for an element identifier of the plurality of element identifiers using at least one of: an amount of connections in the plurality of source files between the element identifier and the plurality of element identifiers, and an amount of appearances of the element identifier in the plurality of source files; and for each selected element identifier of the set of selected element identifiers: generating an element documentation text using a documentation template and a plurality of patterns identified in a plurality of usage instances where in each of the plurality of usage instances the selected element identifier exists in at least one of the plurality of source files; and adding the element documentation text to a repository of documentation text associated with the plurality of source files.

According to a third aspect, a software program product for generating documentation text comprises: a non-transitory computer readable storage medium; first program instructions for: extracting, from a plurality of source files of a software program, a plurality of element identifiers, each identifying an element of the software program; second program instructions for: selecting a set of selected element identifiers of the plurality of element identifiers according to a plurality of scores, each score computed for an element identifier of the plurality of element identifiers using at least one of: an amount of connections in the plurality of source files between the element identifier and the plurality of element identifiers, and an amount of appearances of the element identifier in the plurality of source files; and third program instructions for: for each selected element identifier of the set of selected element identifiers: generating an element documentation text using a documentation template and a plurality of patterns identified in a plurality of usage instances where in each of the plurality of usage instances the selected element identifier exists in at least one of the plurality of source files; and adding the element documentation text to a repository of documentation text associated with the plurality of source files; wherein the first, second, and third program instructions are executed by at least one computerized processor from the non-transitory computer readable storage medium.

According to a fourth aspect, a method for a software development environment comprises: displaying at least one of a plurality of source files of a software program in a graphical user interface (GUI) of the software development environment; accessing a repository of documentation text associated with the plurality of source files, the repository comprising at least one element documentation text documenting at least one element identifier identifying an element of the software program; and displaying the at least one element documentation text in response to a user selecting the at least one element identifier in the GUI; wherein the at least one element documentation text is generated by: extracting, from the plurality of source files, a plurality of element identifiers, each identifying an element of the software program; selecting a set of selected element identifiers of the plurality of element identifiers according to a plurality of scores, each score computed for an element identifier of the plurality of element identifiers using at least one of: an amount of connections in the plurality of source files between the element identifier and the plurality of element identifiers, and an amount of appearances of the element identifier in the plurality of source files; and for each selected element identifier of the set of selected element identifiers: generating an element documentation text using a documentation template and a plurality of patterns identified in a plurality of usage instances where in each of the plurality of usage instances the selected element identifier exists in at least one of the plurality of source files; and adding the element documentation text to a repository of documentation text associated with the plurality of source files.

According to a fifth aspect, a method for generating documentation text comprises: identifying in a plurality of source files of a software program a plurality of element identifiers, each identifying one of: an element of the software program, a logical component of the software program, and a pattern identified in a directory tree in which the plurality of source files are organized; selecting a set of selected element identifiers of the plurality of element identifiers according to a plurality of scores, each score computed for an element identifier of the plurality of element identifiers using at least one of: an amount of connections in the plurality of source files between the element identifier and the plurality of element identifiers, and an amount of appearances of the element identifier in the plurality of source files; and for each selected element identifier of the set of selected element identifiers: generating an element documentation text using a documentation template and a plurality of patterns identified in a plurality of usage instances where in each of the plurality of usage instances the selected element identifier exists in at least one of the plurality of source files and additionally or alternatively in the directory tree; and adding the element documentation text to a repository of documentation text associated with the plurality of source files. Creating an element documentation text for an element that is an element of the software program, a logical component of the software program, or a pattern identified in a directory tree in which the plurality of source files are organized increases usability of documentation generated for the software program compared to other documentation generated only for element identifiers extracted from a plurality of source files of the software program.

With reference to the first and second aspects, in a first possible implementation of the first and second aspects generating the element documentation text further comprises using an example instance selected from the plurality of usage instances. Using an example instance increases usability of the element documentation text. Optionally, generating the element documentation text comprises inserting into the documentation template at least one reference to at least one location in the plurality of source files where the selected element identifier exists in the plurality of source files according to the example instance. Adding a reference to a location in a source file where the selected element identifier exists according to the example instance increases usability of the element documentation text, for example by providing a user using the element documentation text with information connecting the example instance with the selected element identifier. Optionally, the example instance is selected from the plurality of usage instances such that: the example instance has an amount of source code lines in the plurality of source files that is in a target code-size range; the example instance exists in an amount of patterns of the plurality of patterns that exceeds a pattern threshold value; the amount of patterns of the plurality of patterns in which the example instance exists is equal to or is greater than another amount of patterns of the plurality of patterns in which another of the plurality of usage instances exists; and each example pattern of the plurality of patterns in which the example instance exists applies to at least an identified usage amount of other usage instances of the plurality of usage instances. Using an example instance that exemplifies a significant amount of patterns that apply to the selected element identifier (i.e., in an amount of patterns that exceeds a pattern threshold value) increases usability of the element documentation text, providing an example of a sufficient amount of properties of the selected element identifier (i.e. the amount of patterns that apply to the selected element identifier exceeds the pattern threshold value). Using an example instance having an amount of source code lines that is in a target code-size range increases usability of the selected element identifier by providing an example that is neither too long to follow not too short to exemplify usage of the selected element identifier. Using an example instance that exists in at least as many patterns as any other usage instance increases accuracy of the element documentation text compared to using another usage instance that demonstrates fewer patterns. Using an example instance that exemplifies patterns that are common to the plurality of usage instances (i.e. each example pattern of the plurality of patterns in which the example instance exists applies to at least an identified usage amount of other usage instances) increases accuracy of the element documentation text compared to using another usage instance that demonstrates patterns that are not shared with other usage instances.

With reference to the first and second aspects, in a second possible implementation of the first and second aspects the plurality of source files is organized in a directory tree comprising a plurality of directories, and the plurality of patterns includes at least one of: a percent of the plurality of usage instances that exist in a file of the plurality of source file that is stored in an identified directory of the directory tree, a percent of the plurality of usage instances that have a name comprising an identified prefix, a percent of the plurality of usage instances that have a name comprising an identified suffix, a percent of the plurality of usage instances having a reference in an identified file, a percent of the plurality of usage instances having a reference in an identified directory of the plurality of directories, a percent of the plurality of usage instances that reference an identified element identifier of the plurality of element identifiers, and a percent of the plurality of usage instances that have a member method having a name comprising the selected element identifier and another identified suffix. Each of the above mentioned patterns increases accuracy of the element documentation text compared to other documentation text generated without using patterns.

With reference to the first and second aspects, in a third possible implementation of the first and second aspects the plurality of source files is organized in a directory tree comprising a plurality of directories, and each score is computed further using at least one of: a distance of a directory of the plurality of directories from a root directory of the directory tree, where the directory includes a file of the plurality of source files containing the element identifier, and an amount of files in a directory of the plurality of directories that do not contain the element identifier. Using a location of a file containing the element identifier in the directory tree when computing a score increases accuracy of the score, increasing accuracy of the set of selected elements and thus increasing usability of an element documentation text generated for any of the set of selected elements.

With reference to the first and second aspects, in a fourth possible implementation of the first and second aspects generating the element documentation text comprises inserting into the documentation template at least one value computed according to the plurality of patterns. Inserting into the documentation template a value computed according to the plurality of patterns increases usability of the element documentation text compared to other documentation text generated without using the plurality of patterns. Optionally, at least one of the at least one value is one of: a number; text extracted from one of the plurality of source files; a name of a file of the plurality of source files; a reference to a location in a file of the plurality of source files; and an element identifier of the plurality of element identifiers. Optionally, the plurality of source files is organized in a directory tree comprising a plurality of directories and at least one of the at least one value is one of: a name of a directory of the directory tree; and a reference to a directory of the directory tree.

With reference to the first and second aspects, in a fifth possible implementation of the first and second aspects the plurality of element identifiers comprises a plurality of object-oriented-programming class identifiers (a plurality of class identifiers). Optionally, when the element identifier is a class identifier of the plurality of class identifiers, the amount of connections in the plurality of source files between the element identifier and the plurality of element identifiers comprises an amount of inheritance connections between the class identifier and the plurality of class identifiers. Optionally, the plurality of usage instances comprises a plurality of derived classes, each an object-oriented-programming class derived from a selected base class identified by the selected element identifier. Optionally, the score of the class identifier is computed further according to an amount of derived classes derived from a base class of the plurality of classes identified by the class identifier. When the class identifier identifies a base class, using a score computed according to an amount of derived classes derived from the base class increases accuracy of the score as an indicator of a degree of significance of documenting the class identifier and thus increases usability of the created documentation. Optionally, the method further comprises identifying at least one inheritance graph according to a plurality of inheritance connections among the plurality of class identifiers. Optionally, the score of the class identifier is computed further according to a distance of the class identifier from a root class identifier of an inheritance graph of the at least one inheritance graph that includes the class identifier. Using a graph increases accuracy of the score as an indicator of a degree of significance of documenting the class identifier. Optionally, the method further comprises: before selecting the set of selected element identifiers removing from the plurality of element identifiers one or more of: a class identifier having an amount of appearances in the plurality of source files that exceeds an identifier-appearance threshold value; a class identifier identified as a test class, executed for the purpose of testing another of the plurality of class identifiers; and a mix-in class identifier, identifying an inherited class inheriting from an identified base class where a difference between the inherited class and the identified base class, computed using a class comparison function, is below a class-difference threshold. Removing such class identifiers from the plurality of element identifiers increases efficiency of computing a plurality of scores for the plurality of element identifiers by refraining from computing a score for an element identifier that has a lower likelihood of being significant than other element identifiers in the plurality of element identifiers. Optionally, the method further comprises identifying at least one additional element identifier of interest in one of the at least one inheritance graph, such that the one inheritance graph comprises the selected element identifier; computing another plurality of patterns identified in another plurality of usage instances where in each of the other plurality of usage instances at least one of the at least one additional element identifier of interest exists in at least one of the plurality of source files; and selecting an example instance from the other plurality of usage instances. Identifying another element identifier of interest in the one or more graphs increases accuracy of the example instance, thus increasing usability of the element documentation text generated using the example instance.

With reference to the first and second aspects, in a sixth possible implementation of the first and second aspects the method further comprises: in a graphical user interface (GUI) that is displaying at least one of the plurality of source files: displaying an indicator indicating that there is element documentation text associated with the selected element identifier; and displaying the element documentation text in response to a user selecting the selected element identifier in the GUI. Displaying the element documentation text in response to the user selecting the selected element identifier in the GUI increases usability of the element documentation text. Optionally, the method further comprises displaying in the GUI at least a portion of another file of the plurality of source files in response to selecting a reference in the element documentation text, where the reference is a reference to a location in the other file. Optionally, the GUI is part of a software development environment. Optionally, the GUI is implemented in a web browsing application.

With reference to the first and second aspects, in a seventh possible implementation of the first and second aspects adding the element documentation text to the repository of documentation text comprises adding the element documentation text to a document stored in the repository.

With reference to the fifth aspect, in a first possible implementation of the fifth aspect the plurality of element identifiers comprises at least one logical component identifier computed by: extracting from the plurality of source files a plurality of type declaration identifiers; computing a plurality of type usage instances of the plurality of type declaration identifiers, where in each type usage instance a type declaration identifier exists in one of the plurality of source files; for each of the plurality of type usage instances, associate the type declaration identifier of the type usage instance with a directory of a plurality of directories of the directory tree where the directory comprises a source file in which the type usage instance exists such that each directory is associated with a subset of the plurality of type declaration identifiers; compute a list of directories to consider using a plurality of type declaration statistical values computed for a directory of the plurality of directories using the subset of type declaration identifiers associated therewith; and identifying one or more logical components in the list of directories to consider. Associating a type declaration identifier of each of the plurality of type usage instances with a directory increases accuracy of identifying a logical component of the software program. Optionally, the method further comprises computing a plurality of type scores, each for one of the plurality of type declaration identifiers; and removing from the plurality of type declaration identifiers at least one of the plurality of type declaration identifiers according to the score computed therefor. Optionally, the plurality of element identifiers comprises at least one directory identifier identifying a directory as a documentation anchor according to a recurring pattern in a plurality of directories of the directory tree.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 3A:
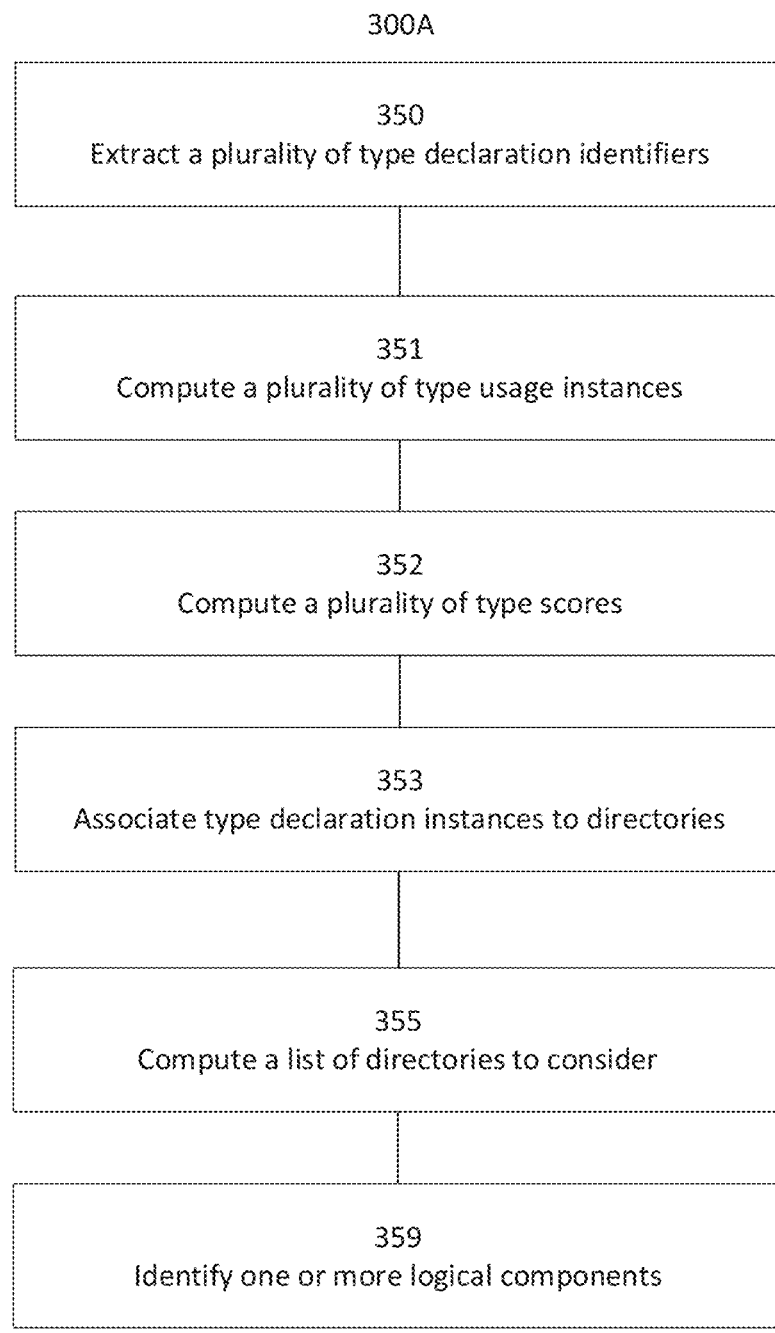
Figure 3B:
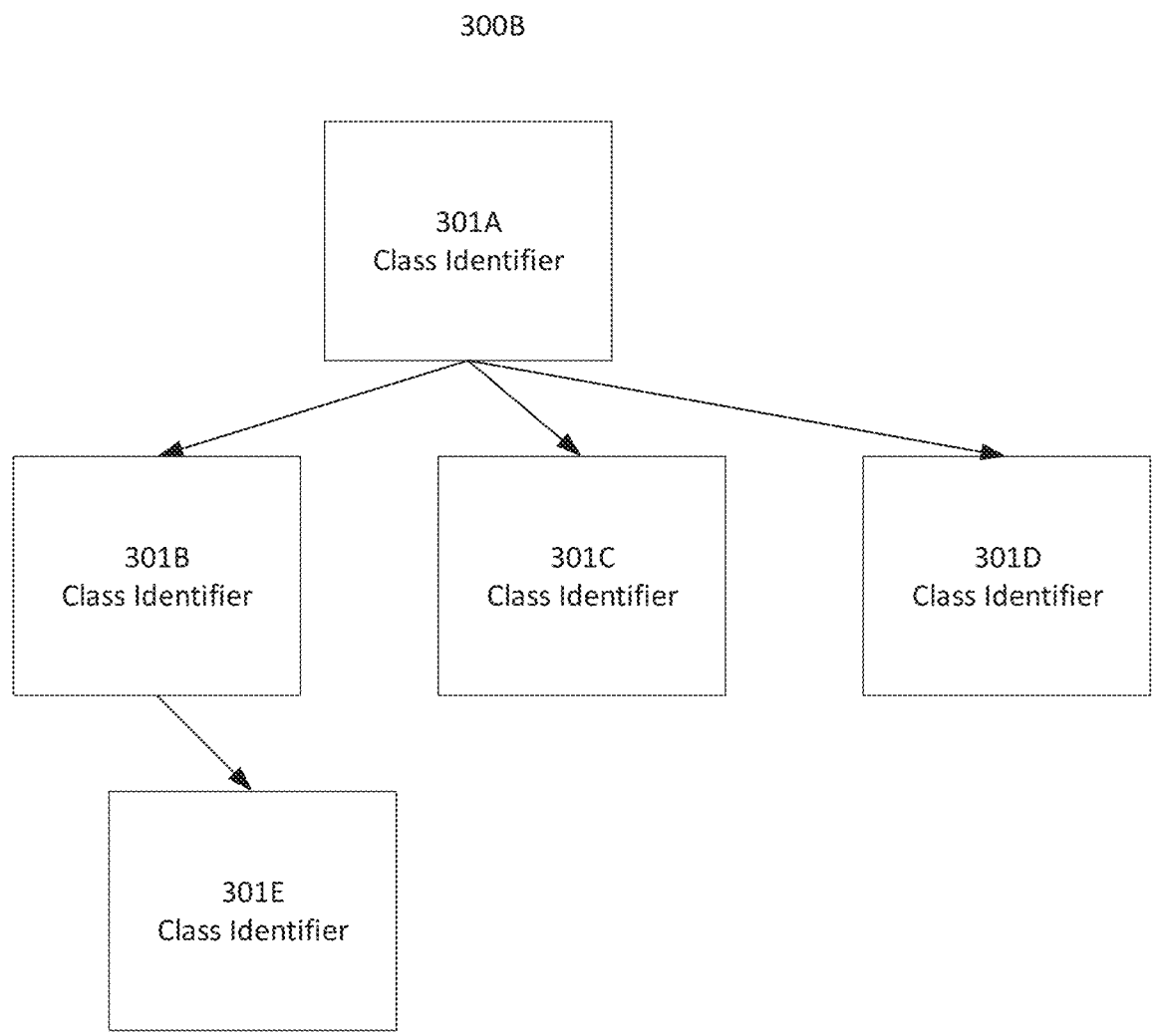
Figure 3C:
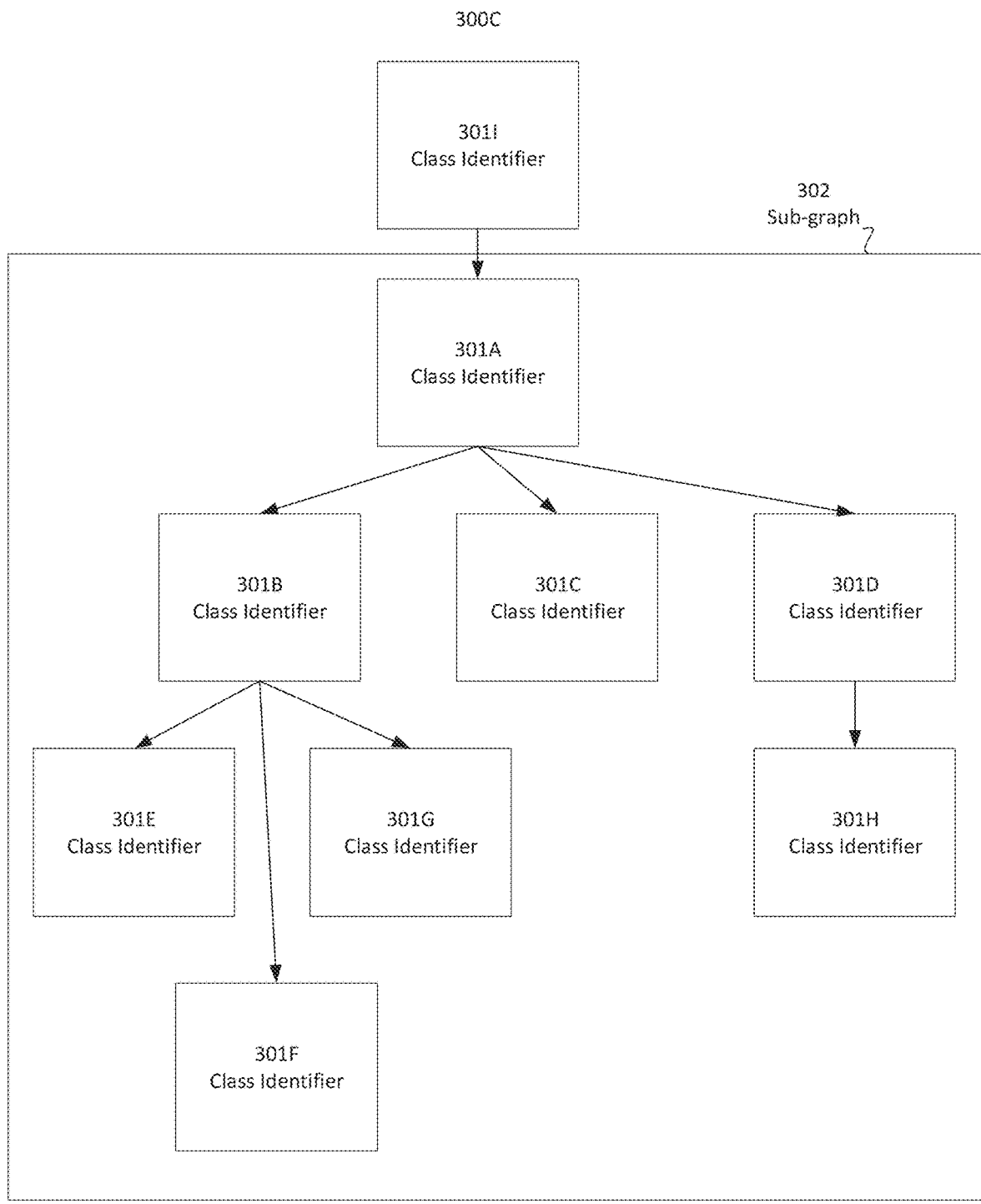
Figure 4A:
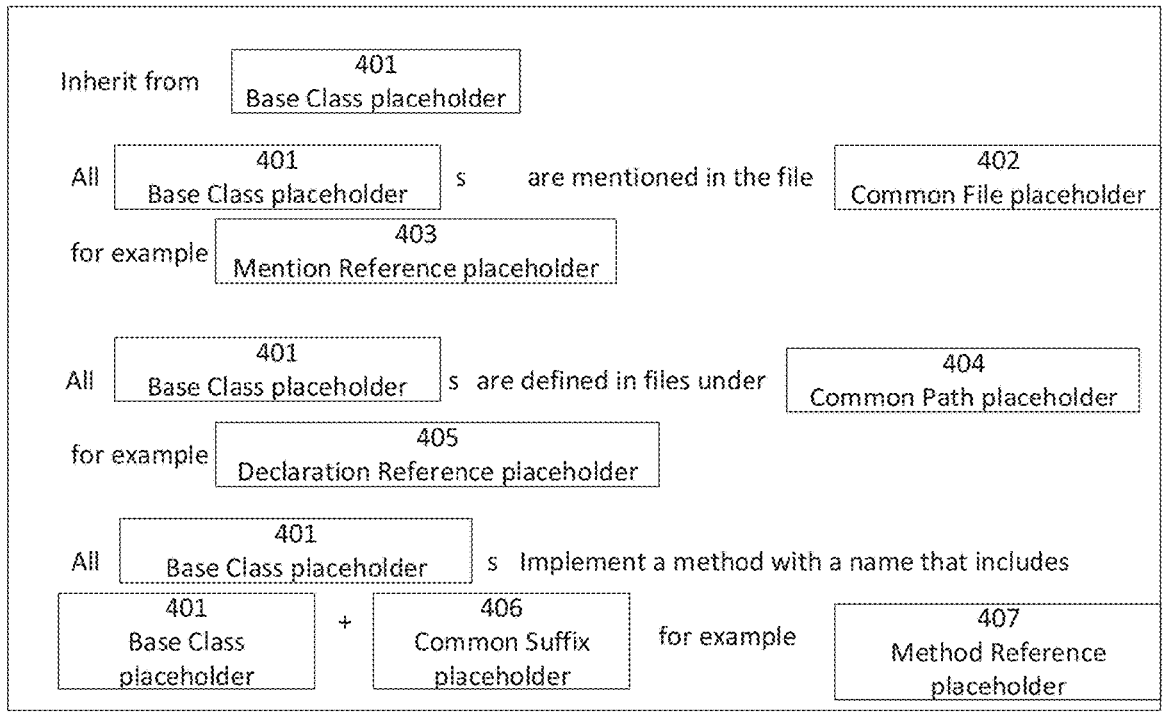
Figure 4B:
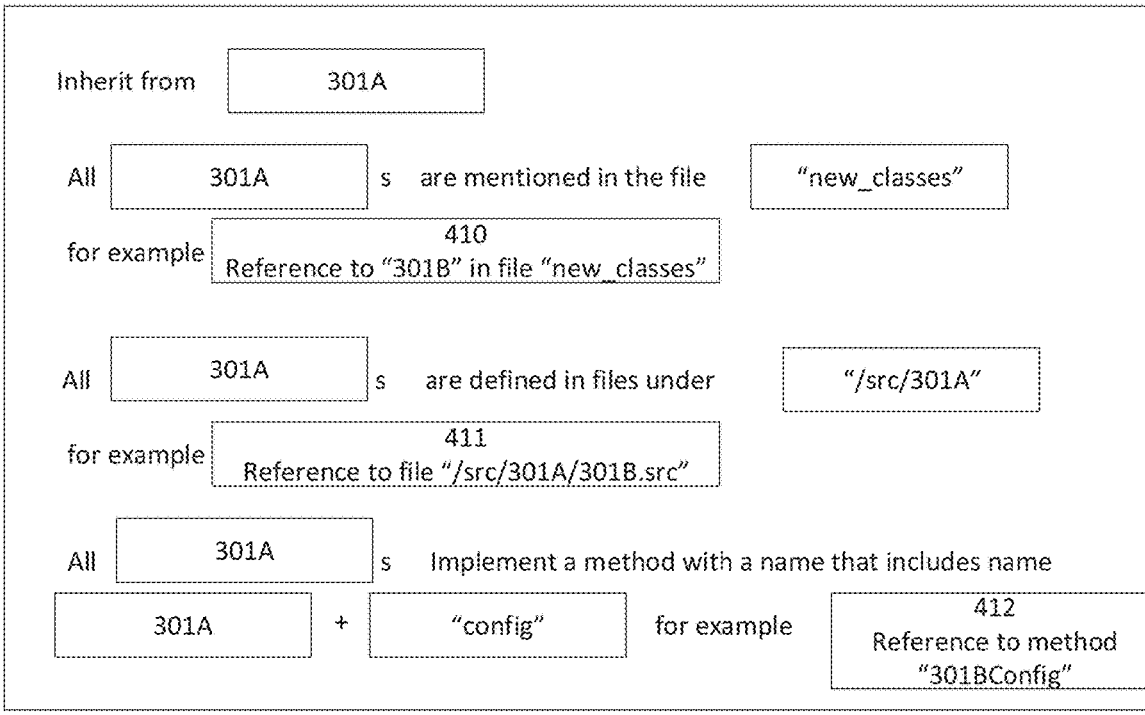
Figure 5:
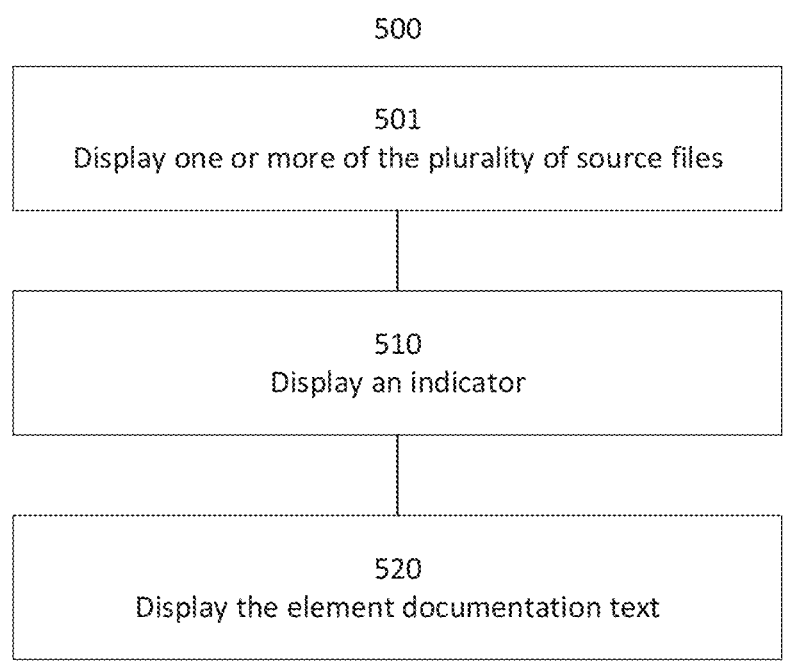
Figure 6:
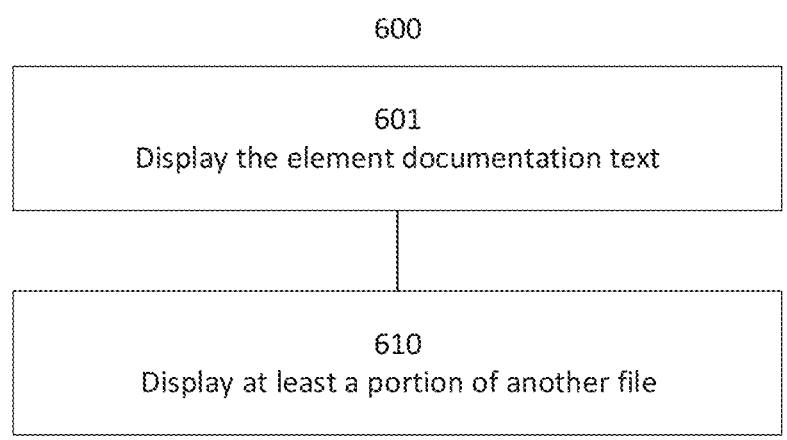
Figure 7:
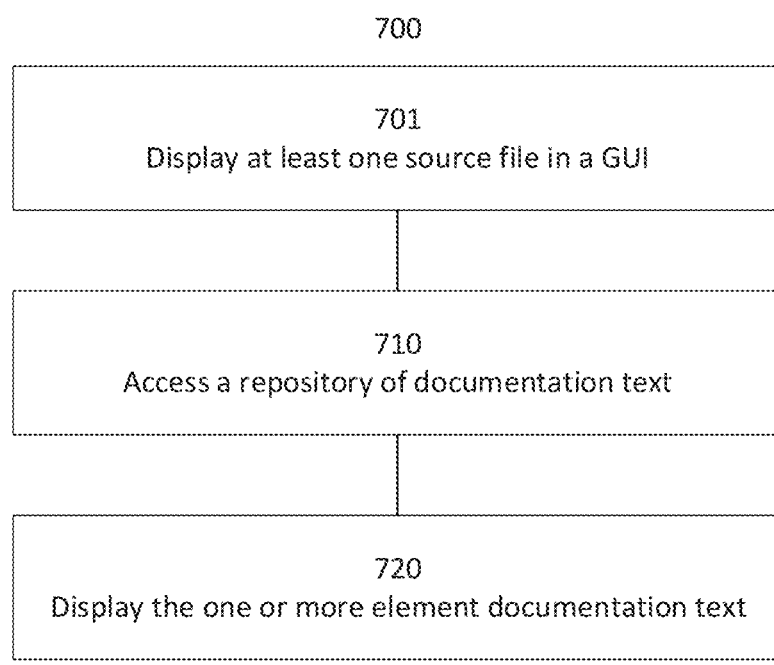
Figure 8:
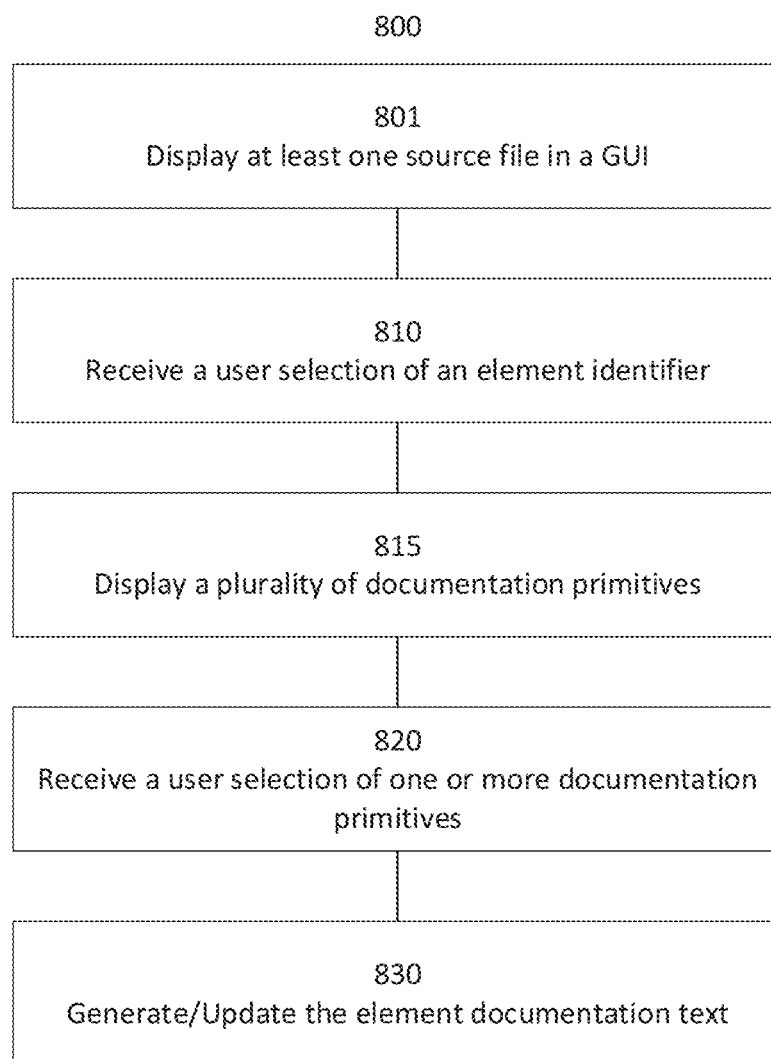

FIG. 3A, showing a flowchart schematically representing an optional flow of operations for identifying a plurality of logical components of the software program, according to some embodiments;

FIG. 3B is a schematic block diagram of an exemplary inheritance graph, according to some embodiments;

FIG. 3C is a schematic block diagram of another exemplary inheritance graph, according to some embodiments;

FIG. 4A is a schematic block diagram of an exemplary documentation template, according to some embodiments;

FIG. 4B is a schematic block diagram of an exemplary element documentation text, according to some embodiments;

FIG. 5 is a flowchart schematically representing an optional flow of operations for a graphical user interface, according to some embodiments;

FIG. 6 is a flowchart schematically representing another optional flow of operations for a graphical user interface, according to some embodiments;

FIG. 7 is a flowchart schematically representing an optional flow of operations for a software development environment; and FIG. 8 is a flowchart schematically representing an optional flow of operations for user generated documentation.

DESCRIPTION OF SPECIFIC EMBODIMENTS OF THE INVENTION

The following description focuses on documenting code of a software program, henceforth also referred to as "code", however the systems and methods described below may be applied to any plurality of files comprising a plurality of element identifiers where it is possible to identify a pattern in a plurality of usage instances of an element identifier of the plurality of element identifiers, where in each usage instance the element identifier exists in one or more of the plurality of files.

Writing documentation that is external to the code of a software program is considered challenging. Many software developers do not see such documentation as part of the code and as such consider writing external documentation outside the scope of their responsibility.

Another challenge in writing external documentation is identifying what parts of the code are important to document. For example, the non-linear order in which code is frequently arranged prevents traversing the code line by line in order to document it. Moreover, in a system consisting of many files and code lines, it is impractical to go over all the code to identify which parts should be documented.

In addition, software developers are not necessarily adept at writing textual documentation. Furthermore, current software development practices tend to prioritize allocating a software developer's time to writing code over writing documentation, not allowing the software developers the amount of time required to produce high-quality documentation.

It is not uncommon to use technical writers to write documentation, however a technical writer may not be fluent in the programming language used to write the code, or in any programming language for that matter. In addition, a technical writer is often an outsider to the engineering domain of the software program and may not be able to recognize what parts of the code are important to document. Furthermore, as it is common practice to use technical writers to write client-facing documentation, i.e. users of the software program, a technical writer may be less adept at writing documentation for software developers.

The present disclosure proposes, in some embodiments described herewithin, a step-by-step method for selecting parts of a software program to document, henceforth referred to as documentation anchors, and for creating documentation for the selected parts, i.e. the selected documentation anchors, using a documentation template and information collected by identifying one or more patterns in source files of the software program.

In some such embodiments, the present disclosure proposes using one or more element identifiers, each identifying an element of the software program, as one or more documentation anchors, and selecting a set of selected element identifiers to document from the plurality of element identifiers by computing a score for each of the plurality of element identifiers. Optionally, at least some of the plurality of element identifiers are extracted from a plurality of source files of the software program. Optionally, at least some other of the plurality of element identifiers identify a plurality of logical components of the software program. When the plurality of source files is organized in a directory tree, optionally at least some additionally other of the plurality of element identifiers are a plurality of directories in the directory tree. In an example, an element identifier is an object-oriented-programming class identifier, identifying a class of the software program written in an object-oriented-programming language. Optionally, the score computed for an element identifier is indicative of a degree of significance of documenting the element identifier. Optionally, the score is computed using one or more statistical values indicative of one or more appearances of the element identifier in the plurality of source files. For example, the score may be computed using an amount of connections in the plurality of source files between the element identifier and the plurality of element identifiers, for example when the element identifier is a class identifier of a plurality of object-oriented-programming class identifiers (plurality of class identifiers), the amount of connections may comprise an amount of inheritance connections between the class identifier and the plurality of class identifiers. Optionally, the score is computed further according to an amount of derived classes derived from a base class of the plurality of classes identified by the class identifier. Optionally, the score is computed using an amount of appearances of the element identifier in the plurality of source files. Computing the score using one or more statistical values indicative of one or more appearances of the element identifier in the plurality of source files increases accuracy of the score as an indicator of a degree of significance of documenting the element identifier and thus increases usability of the created documentation.

Further in such embodiments, the present disclosure proposes identifying for each selected element identifier of the set of selected element identifiers a plurality of patterns in a plurality of usage instances, where in each usage instance of the plurality of usage instances the selected element identifier exists in one or more of the plurality of source files. For example, when the selected element identifier identifies a programming language data type, a usage instance may be a declaration of an object of the programming language data type. In another example, when the selected element identifier identifies a software library, a usage instance may be an instruction to access a method of the software library. In yet another example, when the element identifier is an object-oriented-programming class identifier, a usage instance may be a declaration of a class that is derived from another class identified by the selected element identifier. Optionally, the class is derived directly from the other class, i.e. the class inherits directly from the other class. Optionally, the class is derived from the other class using transitive inheritance, where the class inherits from an additional class that is derived from the other class. Further in such embodiments, the present disclosure proposes generating for the selected element identifier an element documentation text using a documentation template and a plurality of patterns identified in the plurality of usage instances. For example, when the plurality of source files is organized in a directory tree and the selected element identifier is a class identifier, a pattern may be a percent of implemented class instances of the selected element identifier that are implemented in an identified directory of the directory tree. Another example of a pattern is a percent of implemented class instances of the selected element identifier that have a name that has an identified prefix or identified suffix. Another example of a pattern is a percent of implemented class instances of the selected element identifiers that have a method with a name that includes the class name and an identified suffix. Another example of a pattern is a percent of implemented class instances that are used and additionally or alternatively referenced in an identified file. When the selected element identifier identifies a software library, an example of a pattern is a set of instructions to access one or more methods of the software library. Using a plurality of patterns identified in the plurality of usage instances increases accuracy of the element documentation text, i.e. increases accuracy of a description by the element documentation text of the element identified by the selected element identifier. Furthermore, generating the element documentation texts using a plurality of patterns identified in the plurality of usage instances increases consistency in the plurality of source files by providing a reader of the element documentation text with conventions and behaviors in the plurality of source files, enabling that the reader to follow such conventions and behaviors when working and thus increasing accuracy and usability of the plurality of source files.

Optionally, the element documentation text is added to a repository of documentation text associated with the plurality of source files.

Optionally, in some embodiments the present disclosure further proposes selecting an example instance from the plurality of usage instances and generating the element documentation text further using the example instance, optionally by inserting into the documentation template one or more references to one or more locations in the plurality of source files where the selected element identifier exists in the plurality of source files according to the example instance. For example, when the example instance is an example class instance that is derived from another class identified by the selected element identifier, the element documentation text may include a reference to a location in the plurality of source files where the example class instance is declared. Using an example instance to generate the element documentation text increases usability of the element documentation text compared to other documentation text generated without an example instance. Optionally, generating the element documentation text comprises inserting into the documentation template one or more values computed according to the plurality of patterns, some examples being an element identifier, a reference to a location in one of the plurality of source files, a name of a directory in the directory tree, and a reference to a directory in the directory tree.

Optionally, an element identifier of the plurality of element identifiers identifies a pattern identified in a directory tree of the plurality of source files. For example, an element identifier may be a directory identifier, identifying a directory in the directory tree according to a recurring pattern in the directory. For example, a directory may be a documentation anchor when each sub-directory of the directory comprises a set of files having an identified set of file names.

In addition, in some embodiments the present disclosure proposes allowing a user access in a graphical user interface (GUI) to the element documentation text from one or more of the plurality of source files, and vice versa—access in the GUI to one or more of the plurality of source files from the element documentation text. The GUI may be part of a software development environment. Optionally, the GUI is implemented in a web browsing application. For example, in some embodiments the present disclosure proposes displaying one or more of the plurality of source files in a GUI and displaying in the GUI an indicator indicating that there is element documentation text associated with the selected element identifier. The present disclosure, in some embodiments described herewithin, proposes to display the element documentation text in the GUI in response to a user selecting the selected element identifier in the GUI, for example by a mouse click or by highlighting. Some examples of an indicator are displaying the selected element identifier in an identified text color and highlighting the selected element identifier in the GUI. Another example of an indicator is a graphical symbol, optionally displayed in the GUI in proximity to the selected element identifier. The present disclosure, in some embodiments described herewithin, further proposes to display in the GUI at least a portion of another file of the plurality of source files in response to selecting a reference in the element documentation text, where the reference is a reference to a location in the other file. Optionally, the GUI provides the user with a means to select another example instance, different from the example instance used to generate the element documentation text, and to re-generate the element documentation text using the other example instance.

In addition, in some embodiments the present disclosure proposes providing the user access in the GUI to a plurality of documentation primitives for the purpose of generating an element documentation text for an element identifier selected by the user. Optionally, the plurality of documentation primitives comprises one or more of: the plurality of element identifiers, the plurality of usage instances, the plurality of patterns, and at least one documentation template. Optionally, in response to the user selecting the selected element identifier in the GUI, for example by a mouse click or by highlighting, the GUI provides the user with a means for selecting one or more of the plurality of documentation primitives, and optionally generates the element documentation text using the selected documentation primitives. Optionally, the GUI provides the user with a means for selecting the one or more documentation primitives directly. Optionally, the user may select the one or more documentation primitives, for example a documentation template, without selecting the selected element identifier. Optionally, in response to the user entering a text, the GUI provides the user with one or more suggestions to complete the text. For example, in response to the user entering the text "how to add" the GUI may suggest one or more suggestions comprising one or more element identifiers of the plurality of element identifiers. Optionally, in response to the user selecting one of the one or more suggestions to complete the text, the GUI provides the user with the means for selecting the one or more documentation primitives. Optionally, the GUI provides the user with a means for selecting the one or more documentation primitives and re-generating the element documentation text using the selected documentation primitives in each of a plurality of documentation iterations.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
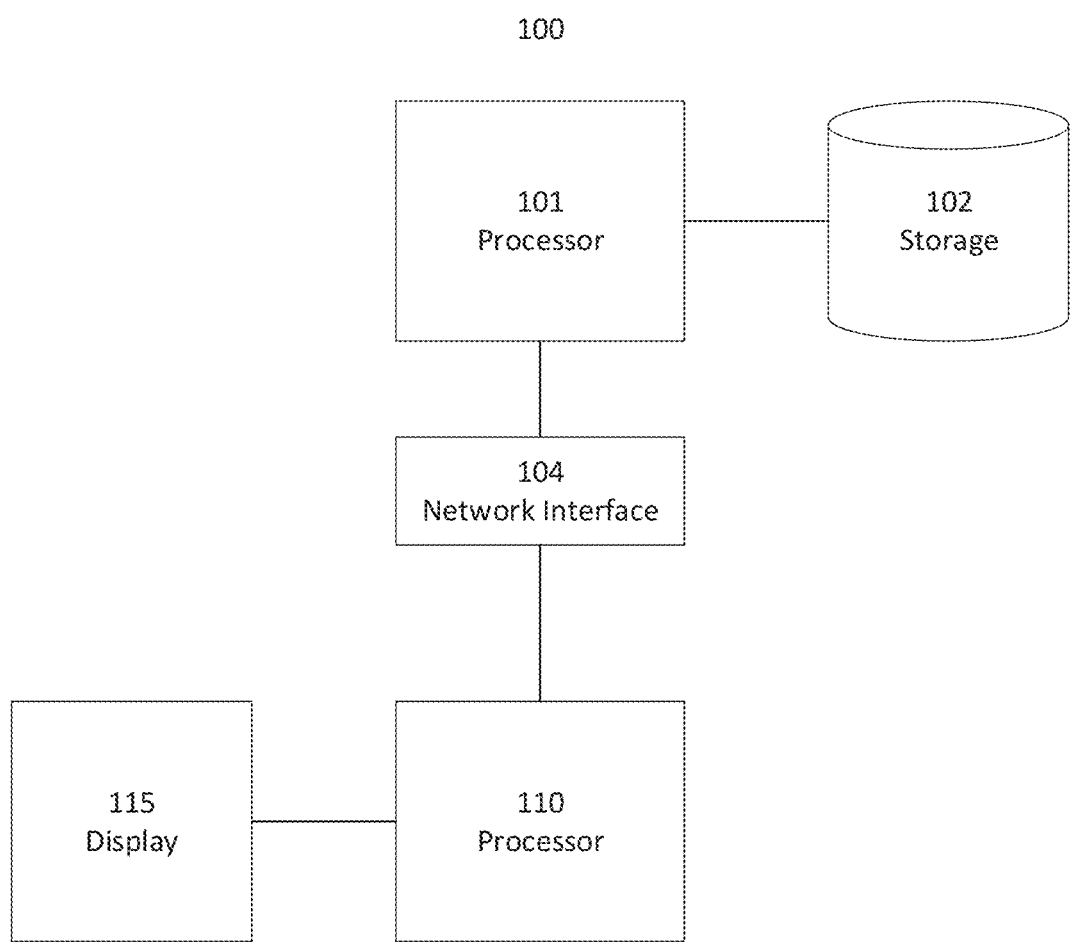
FIG. 1 is a schematic block diagram of an exemplary system, according to some embodiments.

Reference is now made to FIG. 1, showing a schematic block diagram of an exemplary system 100, according to some embodiments. In such embodiments, at least one hardware processor 101 is connected to at least one non-volatile digital storage 102, optionally for the purpose of accessing a plurality of source files and additionally, or alternatively for the purpose of accessing a repository of documentation text. Optionally, the plurality of source files is a plurality of source files of a software program. Some examples of a non-volatile digital storage include a hard disk drive, a network storage and a storage network.

For brevity, henceforth the term "storage" is used to mean "at least one non-volatile digital storage" and the terms are used interchangeably, and the term "processing unit" is used to mean "at least one hardware processor" and the terms are used interchangeably.

Optionally, the storage 102 is connected to the processing unit 101 via at least one digital communication network interface 104. Optionally, at least one digital communication network interface 104 is connected to a local area network (LAN), for example an Ethernet network or a Wi-Fi network. Optionally, at least one digital communication network interface 104 is connected to a wide area network (WAN), for example a cellular network or the Internet. Optionally, another processing unit 110 is connected to at least one display device 115, optionally for the purpose of displaying a graphical user interface (GUI) to a user. Optionally, the other processing unit 110 is connected to storage 102, optionally via the at least one digital communication interface 104. Optionally, the other processing unit 110 is processing unit 101.

To generate documentation text, in some embodiments system 100 implements the following method.

Figure 2:
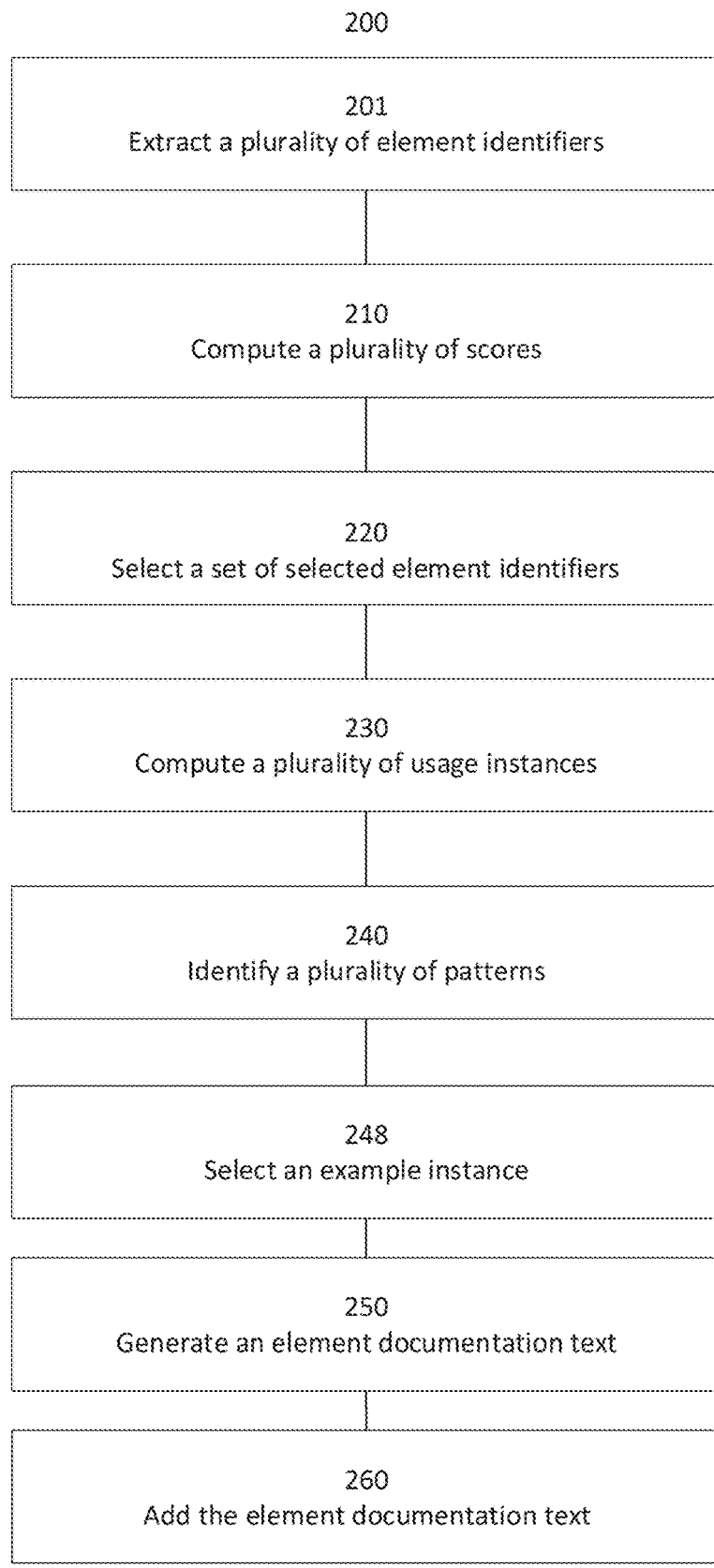
FIG. 2 is a flowchart schematically representing an optional flow of operations for generating documentation text, according to some embodiments.

Reference is now made also to FIG. 2, showing a flowchart schematically representing an optional flow of operations 200 for generating documentation text, according to some embodiments. In such embodiments, in 201 processing unit 101 extracts a plurality of element identifiers from a plurality of source files. When the plurality of source files is a plurality of source files of a software program, each of the plurality of element identifiers optionally identifies an element of the software program. Henceforth the description focuses on a plurality of element identifiers extracted from a plurality of source files of a software program, however the methods described below may be applied to other element identifiers extracted from source files that are not source files of a software program, for example source files of a testing process, or change records in a version control system such as git. In addition, in some embodiments the methods described below are applied to other element identifiers identified in the plurality of source files but not extracted therefrom, for example a plurality of logical component identifiers, identifying a plurality of logical components of the software program. Another example of an element identifier identified in the plurality of source files and not extracted therefrom is a directory identifier identifying a directory in a directory of tree in which the plurality of source files of the software program are organized. In such embodiments, in 201 the processing unit 101 identifies the plurality of element identifiers.

Reference is now made also to FIG. 3A, showing a flowchart schematically representing an optional flow of operations 300A for identifying a plurality of logical components of the software program, according to some embodiments.

In such embodiments, in 350 the processing unit 101 extracts from the plurality of source files a plurality of type declaration identifiers. Optionally, a type declaration identifier identifies a data type of the software program. Optionally, a type declaration identifier identifies a JavaScript library component, some examples being a react component and a Vue component. Optionally, some of the plurality of type declaration identifiers are extracted using the ctags programming tool.

In 351, the processing unit 101 optionally computes a plurality of type usage instances of the plurality of type declaration identifiers, where in each type usage instance a type declaration identifier exists in one of the plurality of source files. For example, a type usage instance of a type declaration identifier may be a declaration of a variable of a type identified by the type declaration identifier.

In 352, the processing unit 101 optionally computes a plurality of type scores, each for one of the plurality of type declaration identifiers. Optionally, computing a type score comprises using an amount of appearances of the type declaration identifier in the plurality of source files. Optionally, computing a type score comprises using an amount of files of the plurality of source files in which the type declaration identifier appears. Optionally, the plurality of type declaration identifiers, an amount of appearances of each of the plurality of type declaration identifiers in the plurality of source files, and an amount of files in which each of the plurality of type declaration identifiers appears are all extracted simultaneously, for example by searching only source code files, ignoring comments and ignoring self-references. Optionally, the processing unit 101 removes at least one of the plurality of type declaration identifiers from the plurality of type declaration identifiers according to the score computed for the type declaration identifier, such that the removed type declaration identifier is not used to identify the plurality of logical component.

A logical component may be identified by one or more type declaration identifiers that are unique to the logical component, i.e. there may exist one or more type declaration identifiers used in one or more files of the logical component and not used in other files of other logical components.

Optionally, the plurality of source files of the software program is organized in a directory tree comprising a plurality of directories. In 353, for each of the plurality of type usage instances the processing unit 101 associates the type declaration identifier of the type usage instance with a directory of the plurality of directories comprising the source file in which the type usage instance exists, such that each directory is associated with a subset of the plurality of type declaration identifiers. Optionally, a directory is additionally associated with one or more subsets of the plurality of type declaration identifiers associated with one or more subdirectories of the directory, where for each of the one or more subdirectories a path exists in the directory tree from the directory to the subdirectory.

Optionally, the processing unit 101 identifies for each directory a set of relevant type declaration identifiers in the subset of type declaration identifiers associated therewith. Optionally, a ratio between an amount of identifiers in the set of relevant type declaration identifiers and another amount of identifiers in the plurality of type declaration identifiers is equivalent to a target ratio value, for example 20%, optionally according to a ratio equivalence test. Optionally, the amount of identifiers in the set of relevant type declaration identifiers is at least a minimum threshold amount, for example at least 30 type declaration identifiers. The minimum threshold amount may be any value equal to or greater than 0, some examples being 5, 17, 45, 80, 270 and 1000. Optionally, the amount of identifiers in the set of relevant type declaration identifiers is no more than a maximum threshold amount, for example no more than 100 type declaration identifiers. The maximum threshold amount may be any value equal to or greater than 0, some examples being 30, 55, 200 and 2000.

In 355, the processing unit 101 computes a list of directories to consider. Optionally, the processing unit 101 computes for at least one of the plurality of directories a plurality of type declaration statistical values using the subset of the type declaration identifiers associated therewith. Optionally, for a directory of the plurality of directories the plurality of type declaration statistical values comprises at least one of: an amount of files in the directory and additionally the directory's plurality of subdirectories (directory files), an amount of a plurality of unique identifiers in a plurality of sets of relevant type declaration identifiers associated with the directory and additionally any of the directory's subdirectories, an amount of files in the directory and additionally any of the directory's subdirectories comprising at least one of the plurality of unique identifiers (related files), an amount of files in the directory and additionally any of the directory's subdirectories that do not comprise any of the plurality of unique identifiers (unrelated files), a percentage of the amount of unrelated files of the amount of directory files, a difference amount of unrelated files between an amount of unrelated files of the directory and an amount of unrelated files of a parent directory of the directory, a percentage of the difference amount of unrelated files of the directory and the amount of unrelated files of the directory, a difference amount of identifiers between an amount of a plurality of unique identifiers of the directory and an amount of a plurality of unique identifiers of the parent directory of the directory, a percentage of the difference amount of identifiers and the amount of the plurality of unique identifiers of the directory, and a ratio between the difference amount of entities and the difference amount of unrelated files.

Optionally, the processing unit 101 adds a directory to the list of directories to consider according to the difference amount of unrelated files and additionally or alternatively according to the difference amount of unique identifiers. For example, a parent directory may be added to the list of directories to consider when the difference amount of identifiers between the parent directory and a child directory exceeds a threshold amount of identifiers and a difference amount of unrelated files between the parent directory and the child directory is equivalent to the difference amount of identifiers, according to an amount equivalence test. For example, when a parent directory has 4 unrelated files more than the child directory, and 2 unique identifiers more than the child directory.

Optionally, the processing unit 101 declines to add a parent directory to the list of directories to consider and instead adds a child directory according to the difference amount of unrelated files and additionally or alternatively according to the difference amount of unique identifiers. For example, a child directory may be added to the list of directories to consider when the difference amount of identifiers between the parent directory and the child directory exceeds a threshold amount of identifiers and a difference amount of unrelated files between the parent directory and the child directory is not equivalent to the difference amount of identifiers, according to the amount equivalence test. For example, when the parent directory has 31 unique identifiers more than the child directory, and only 9 more unrelated files than the child directory.

Optionally, in 359 the processing unit 101 identifies in the list of directories to consider a plurality of logical components of the software program according to the plurality of type declaration statistical values computed for each of the plurality of directories using the subset of the type declaration identifiers associated therewith.

Optionally the processing unit 101 identifies in the plurality of type declaration identifiers a first group of type declaration identifiers that is associated with a directory of the list of directories to consider and optionally with one or more of the directory's subdirectories, and a second group of type declaration identifiers that is not associated with any of the directory and the one or more of the directory's subdirectories.

Optionally, a directory identifier of the directory is used as a logical component identifier identifying the logical component.

Optionally, the plurality of element identifiers comprises one or more directory identifiers, each identifying a directory as a documentation anchor according to a recurring pattern in the plurality of directories. For example, and element identifier may be a directory identifier when each subdirectory of the directory comprises a set of files having an identified set of filenames. Another example of a recurring pattern identifying a directory identifier as a documentation anchor is when each subdirectory of the directory comprises a file whose name comprises the name of the subdirectory and an identified directory name prefix and additionally or alternatively an identified directory name suffix. Yet another example of a recurring pattern identifying a directory identifier as a documentation anchor is when each subdirectory of the directory comprises a file containing an identified element identifier, for example a function named "discover". An additional example of a recurring pattern identifying a directory identifier as a documentation anchor is when each subdirectory comprises a file that is imported into an identified file of the plurality of source files.

Reference is now made again to FIG. 2. In 210, the processing unit 101 optionally computes a plurality of scores, each score computed for an element identifier of the plurality of element identifiers. Optionally, a score for an element identifier is computed using an amount of connections in the plurality of source files between the element identifier and the plurality of element identifiers. For example, when a first element identifier has more connections than a second element identifier, a first score computed for the first element identifier may be higher than a second score computed for the second element identifier. Optionally, the score for the element identifier is computed using an amount of appearances of the element identifier in the plurality of source files. For example, when the first element identifier appears in the plurality of source files more times that the second element identifier appears therein, the first score computed for the first element identifier may be higher than the second score computed for the second element identifier. In an example, when the element identifier identifies a software library the score for the element identifier is computed according to an amount of instructions in the plurality of source files to access one or more methods of the software library.

Optionally, the plurality of source files is identified in a directory tree comprising a plurality of directories. Optionally, a directory of the plurality of directories includes a file of the plurality of files containing the element identifier. It may be more significant to document an element identifier that exists in a directory that is closer to the root directory than another element identifier that exists in another directory that is further away from the root directory than the directory. Optionally, a score of an element identifier is computed using a distance of the directory of the plurality of directories from a root directory of the directory tree.

Optionally, it may be more significant to document an element identifier that exists in a large amount of files in the directory than another element identifier that exists in fewer files in the directory. Optionally, a score of an element identifier is computed using an amount of files in a directory of the plurality of directories that do not contain the element identifier.

Optionally, the software program is designed according to an object-oriented-programming paradigm and comprises a plurality of classes. Optionally, the plurality of element identifiers comprises a plurality of object-oriented-programming class identifiers (a plurality of class identifiers), each identifying a class of the software program's plurality of classes. Optionally, when an element identifier is a class identifier, the amount of connections in the plurality of source files between the element identifier and the plurality of element identifiers comprises an amount of inheritance connections between the class identifier and the plurality of class identifiers. Optionally, the processing unit 101 is further configured for identifying one or more inheritance graphs according to a plurality of inheritance connections among the plurality of class identifiers.

Reference is now made also to FIG. 3B, showing a schematic block diagram of an exemplary inheritance graph 300B, according to some embodiments. Optionally, the plurality of class identifiers comprises class identifier 301A, class identifier 301B, class identifier 301C, class identifier 301D, and class identifier 301E, collectively referred to as plurality of class identifiers 301. Optionally, class identifier 301A has an inheritance connection with each of class identifier 301B, class identifier 301C and class identifier 301D such that class identifier 301A identifies a base class of the plurality of classes of the software program and each of class identifier 301B, class identifier 301C and class identifier 301D identify a derived class that is derived from the base class. Optionally, class identifier 301E identifies another derived class that is derived from the derived class identified by class identifier 301B such that the other derived class identified by class identifier 301E is derived indirectly from the derived class identified by class identifier 301B.

It may be more significant to document a base class from which more classes are derived than another base class from which fewer classes are derived, for example it may be more significant to document a base class identified by element identifier 301A than another base class identified by class identifier 301B. Optionally, the score for a class identifier is computed further according to an amount of derived classes derived from a base class identified by the class identifier.

It may be more significant to document a base class that is higher up in an inheritance graph, that is the base class is closer to a root class of the inheritance graph, for example a class identified by the class identifier 301B, than another class that is further down the inheritance graph, for example another class identified by class identifier 301E, that is the other class is farther from the root class of the inheritance graph than the base class. On the other hand, it may be less significant to document a base class that is very high in an inheritance graph, indicative of a general base class for which there is less need to provide documentation. Optionally, the score of the class identifier is computed further according to a distance of the class identifier from the root of an inheritance graph of the one or more inheritance graphs where the inheritance graph includes the class identifier.

Optionally, when the processing unit 101 identifies more than one inheritance graph, it may be more significant to document a first class identifier in a first inheritance graph of the more than one inheritance graph than to document a second class identifier in a second inheritance graph of the more than one inheritance graph. Optionally, the score for a class identifier is computed further according to a set of scores of a set of class identifiers in an inheritance graph comprising the class identifier.

Reference is now made again to FIG. 2. Optionally, in 220 the processing unit 101 selects a set of selected element identifiers from the plurality of element identifiers according to the plurality of scores. For example, a selected element identifier of the set of selected element identifiers may have a score that exceeds an identified score threshold. In another example, the set of selected element identifiers consists of an identified amount of element identifiers having highest scores of the plurality of scores.

Optionally, when the processing unit 101 identifies more than one inheritance graph, the processing unit 101 may select a set of inheritance graphs from the more than one inheritance graphs according to at least some scores of the plurality of scores each computed for a root class of one of the more than one inheritance graph. Optionally, the processing unit selects at least one of the set of selected element identifiers from at least one of the set of inheritance graphs.

There may exist element identifiers for which a-priori there is less need to generate documentation. Some examples include a test class, i.e. a class that is executed for the purpose of testing another of the plurality of class identifiers, a common identifier that appears many times, and a mix-in class identifier, i.e. a class identifier that identifies an inherited class that inherits from an identified base class that overrides minimal functionality of the identified base class. Optionally, the difference between the inherited class and the identified base class is below a class-difference threshold, where the difference is computed using a class comparison function. Optionally, before selecting the set of selected element identifiers the processing unit 101 removes one or more element identifiers from the plurality of element identifiers. Optionally, the processing unit 101 removes from the plurality of element identifiers at least one class identifier having an amount of appearances in the plurality of source files that exceeds an identifier-appearance threshold value. Optionally, the processing unit 101 removes from the plurality of element identifiers at least one class identifier identified as a test class. Optionally, the processing unit 101 removes from the plurality of element identifiers at least one mix-in class identifier.

Optionally, the processing unit 101 repeats 230, 240, 248, 250 and 260 for each selected element identifier of the set of selected element identifiers.

Optionally, in 230 the processing unit 101 computes a plurality of usage instances, where in each usage instance of the plurality of usage instances the selected element identifier exists in one or more of the plurality of source files and additionally or alternatively in a directory of a directory tree in which the plurality of source files are organized. For example, a usage instance may be a declaration of a variable using the selected element identifier. Another example of a usage instance is a definition of a derived class, derived from a base class identified by the selected element identifier. Optionally, the plurality of usage instances comprises a plurality of derived classes, each an object-oriented-programming class derived from a selected base class identified by the selected element identifier. When the selected element identifier identifies a software library, a usage instance may be an instruction to access a method of the software library. When the selected element identifier is a directory, a usage instance may be a sub-directory of the directory.

In 240, the processing unit 101 optionally identifies a plurality of patterns in the plurality of usage instances. The patterns may be indicative of one or more coding practices used when developing the software program. For example, a pattern may be a percent of the plurality of usage instances that exist in a file of the plurality of source files that is stored in an identified directory of the directory tree of the plurality of source files. In another example, a pattern is a percent of the plurality of usage instances that have a name comprising an identified prefix. Optionally, a pattern is a percent of the plurality of usage instances that have a name comprising an identified suffix. Optionally, a pattern is a percent of the plurality of usage instances existing in an identified file. Optionally, for example when the element identifier identifies a software library, a pattern may be a set of instructions to access one or more methods of the software library. Optionally, the set of instructions is distributed in more than one of the plurality of source files. Optionally, the processing unit 101 identifies the set of instructions using one or more known library usage patterns. Optionally, the processing unit 101 identifies the set of instructions by identifying at least one difference between the set of instructions and the one or more known library usage patterns according to at least one test applied to the set of instructions and the one or more known library usage patterns. Other examples of a pattern include, but are not limited to, a percent of the plurality of usage instances having a reference in an identified directory of the plurality of directories, a percent of the plurality of usage instances that reference an identified element identifier of the plurality of element identifiers, a percent of the plurality of usage instances that have a member method having a name comprising the selected element identifier and another identified suffix, and a percent of the plurality of usage instances that have a member variable having a name comprising the selected element identifier and yet another identified suffix.

In 248, the processing unit 101 optionally selects an example instance of the plurality of usage instances. For example, for selected element identifier class identifier 301A, the example instance may be a derived class identified by class identifier 301B. Optionally, the example instance is selected such that the example instance exists in an amount of patterns of the plurality of patterns that exceeds a pattern threshold value, for example 90% of the plurality of patterns. Optionally, the pattern threshold value is equal to the amount of patterns of the plurality of patterns, that is the example pattern exists in all of the plurality of patterns.

Optionally, the example instance has an amount of source code lines in the plurality of source files that is in a target code-size range. For example, the target code size range may be a range around a median value of a plurality of code-sizes, each code-size an amount of code lines in the plurality of source files of one of the plurality of usage instances.

Optionally, the example instance exemplifies patterns that apply to a significant amount of the plurality of usage instances. Optionally, each example pattern of the plurality of patterns in which the example instance exists applies to at least an identified usage amount of other usage instances of the plurality of usage instances. For example, the identified usage amount may be 75% or 80% of the plurality of usage instances.

Optionally, the example instance exemplifies as many patterns as any other of the plurality of usage instances. Optionally, the amount of patterns of the plurality of patterns in which the example instance exists is equal to or is greater than another amount of patterns of the plurality of patterns in which another of the plurality of usage instances exists.

Reference is now made also to FIG. 3C, showing a schematic block diagram of another exemplary inheritance graph 300C, according to some embodiments. In this example, selected element identifier class identifier 301A identifies a base class that is derived from a parent class identified by class identifier 301I.

Optionally, inheritance graph 300C comprises a sub-graph 302 consisting of a sub-set of class identifiers comprising class identifier 301A, class identifier 301B, class identifier 301C, class identifier 301D, class identifier 301E, class identifier 301F, class identifier 301G, and class identifier 301H. Optionally, class identifier 301A is a root of sub-graph 302. In this example, class identifier 301A is a root of sub-graph 302.

Optionally, the processing unit 101 identifies in a sub-graph 302 one or more additional element identifiers of interest. A terminal class identifier is an identifier that identifies a class from which no other classes are derived, for example class identifier 301C, class identifier 301E, class identifier 301F, class identifier 301G and class identifier 301H. Optionally, the processing unit 101 identifies the one or more additional element identifiers of interest according to a respective amount of terminal class identifiers connected to each of the sub-set of class identifiers. Optionally, an element identifier of interest is a class identifier of sub-graph 302 that identifies a class having more derived terminal classes than other classes identified by the sub-set of class identifiers. For example, in sub-graph 302 class identifier 301A identifies a first class with one terminal derived class identified by class identifier 301C and class identifier 301D identifies a second class with one other terminal derived class identified by class identifier 301H, whereas class identifier 301B identifies a third class with three terminal derived classes identified by class identifier 301E, class identifier 301F, and class identifier 301G. Thus, in this example class identifier 301B may be an additional element identifier of interest.

Optionally, the example instance is a derived class selected from one or more classes directly derived from a class identified by the selected element identifier. Optionally, when the processing unit 101 identifies one or more additional element identifiers of interest, the processing unit 101 selects the example instance such that the example instance is another derived class selected from one or more other classes directly derived from another class identified by one of the one or more additional element identifiers of interest, for example another class identified by class identifier 301G, instead of selecting from the one or more classes directly derived from the class identified by the selected element identifier.

Reference is now made again to FIG. 2. In 250, the processing unit 101 optionally generates an element documentation text using a documentation template and the plurality of patterns. Optionally, the documentation template is a text written using a template definition syntax, for example Django Software Foundation template engine syntax. Optionally, the processing unit 101 further uses the example instance when generating the element documentation text. Optionally, when the plurality of element identifiers comprises a plurality of logical component identifiers, the document template is a template of an overview documentation text describing the software program and additionally or alternatively the plurality of source files. Optionally, the processing unit 101 uses the documentation template and the plurality of logical component identifiers to generate the element documentation text.

Optionally, when the plurality of element identifiers comprises a plurality of directory identifiers and the selected element identifier is one of the plurality of directory identifiers, the document template may describe how to add a subdirectory to the directory identified by the directory identifier. In this example, an example instance may be one of the subdirectories of the directory.

Reference is now made also to FIG. 4A, showing a schematic block diagram of an exemplary documentation template 400A, according to some embodiments. In this example, the documentation template 400A is part of a template for documenting how to create an inherited class from a base class identified by the selected element identifier. In this example, the documentation template 400A comprises a base class placeholder 401, used in several places in the template to reference the base class. Further in this example, the documentation template 400A comprises a common file placeholder 402, for a reference to a file of the plurality of source files in which derived classes are mentioned. Optionally, the documentation template 400A comprises a mention reference placeholder 403, for a reference to a part of a source file of the plurality of source files that is part of the example instance in which a derived class is mentioned. In addition, in this example the documentation template 400A comprises a common path placeholder 404, for a reference to a directory of the plurality of directories in which derived classes are defined. Optionally, the documentation template 400A comprises a declaration reference placeholder 405, for a reference to a file in the directory of the plurality of directories where the example instance is declared. In addition, in this example the documentation template 400A comprises a common suffix placeholder 406, for a suffix used in a method implemented in a derived class. Optionally, the documentation template 400A comprises a method reference placeholder 407, for a reference to a part of a source file of the plurality of source files that is part of the example instance in which the method is implemented.

Other examples of a template may include additional or alternative clauses, for example, a clause comprising another common suffix placeholder for another suffix used in the name of the derived class. Other examples of additional or alternative clauses include a clause comprising a common identified name of a method, and a clause comprising a common identified name of a variable.

Reference is now made again to FIG. 2. Optionally, to generate the element documentation text the processing unit 101 inserts into the documentation template one or more values computed according to the plurality of patterns, for example a number. Optionally, a value is text extracted from one of the plurality of source files, for example a name of a method or one or more code lines comprising the selected element identifier. Optionally, a value is a name of a file of the plurality of source files. Optionally, a value is a reference to a location in a file of the plurality of source files. Optionally, a value is an element identifier. Optionally, a value is a name of a method. Optionally, a value is a name of a directory of the directory tree. Optionally, a value is a reference to the directory. Optionally, to generate the element documentation text the processing unit 101 inserts into the documentation template one or more references to one or more locations in the plurality of source files where the selected element identifier exists in the plurality of source files according to the example instance.

Optionally, to generate the element documentation text the processing unit 101 inserts into the documentation template one or more text placeholders, for a user to add additional text to the element documentation text.

Reference is now made to FIG. 4B, showing a schematic block diagram of an exemplary element documentation text 400B, according to some embodiments. In this example, the documentation template was used to create an element documentation text documenting class identifier 301A, using example usage class identifier 301B. In this example, the class identifier "301A" was inserted instead of the base class identifier 401. Further in this example, the file name "new_classes.ext" was inserted instead of the common file place holder 402, and a reference 410 to the text "301B" in the file "new_classes.ext" was inserted instead of the mention reference placeholder 403. Optionally, the reference 410 further includes one or more lines of code extracted from the file "new_classes.ext".

Further in this example, the directory name "/src/301A" was inserted instead of the common path placeholder 404, and a reference 411 to the file "/src/301A/301B.src" in the directory "/src/301A" was inserted instead of the declaration reference placeholder 405. Optionally, the reference 411 further includes one or more lines of code extracted from the file "/src/301A/301B.src".

Further in this example, the suffix "config" was inserted instead of the common suffix placeholder 406, and a reference 412 to the method "301Bconfig" in another of the plurality of source files was inserted instead of the method reference placeholder 407. Optionally, the reference 412 further includes one or more lines of code extracted from the other file. Optionally, the other file is "/src/301A/301B.src".

Optionally, when the processing unit 101 identifies one or more additional element identifiers of interest, the processing unit 101 identifies another plurality of patterns in a sub-set of the plurality of usage instances selected from the plurality of usage instances. Optionally, each of the sub-set of usage instances is a usage instance of at least one of the one or more additional element identifiers of interest, i.e. each of the sub-set of usage instances is an instance where at least one of the one or more additional element identifiers of interest exists in one or more of the plurality of source files. Optionally, the processing unit 101 selects the sub-set of the plurality of usage instances such that in each of the sub-set of the plurality of usage instances at least one of the one or more additional element identifiers of interest exists in one or more of the plurality of source files. Optionally, the processing unit 101 selects the sub-set of the plurality of usage instances such that in each of the sub-set of the plurality of usage instances the at least one of the one or more additional identifiers of interest identifies a parent class of the example instance. Optionally, the example instance is selected from the sub-set of the plurality of usage instances.

Optionally, the processing unit 101 adds one or more text sections to the element documentation text according to the other plurality of patterns. Optionally, at least one of the one or more text sections refers to at least one of the one or more additional element identifiers of interest, for example to instruct a user to directly inherit from a class identified by the at least one additional element identifier of interest. Optionally, at least one other of the one or more text sections refers to the selected element identifier, for example to instruct a user not to directly inherit from a class identified by the selected element identifier.

Reference is now made again to FIG. 2. In 260, the processing unit 101 optionally adds the element documentation text to a repository of documentation text associated with the plurality of source files, optionally in storage 102. Optionally, adding the element documentation text to the repository comprises adding the element documentation text to a document stored in the repository. Optionally, a document in the repository documents one element identifier of the plurality of element identifiers. Optionally, a document in the repository documents more than one element identifier of the plurality of element identifiers.

In some embodiments described herewithin, the element documentation text is provided to a user via a GUI.

For brevity, the term "display device" is used to mean "at least one display device".

Reference is now made also to FIG. 5, showing a flowchart schematically representing an optional flow of operations 500 for a graphical user interface, according to some embodiments. In such embodiments, other processing unit 110 displays in 501 one or more of the plurality of source files in a GUI on display device 115. Optionally, the GUI is implemented in a web browsing application. Optionally, the GUI is part of a software development environment.

Optionally, in 510, the other processing unit 110 displays in the GUI an indicator indicating that there is element documentation text associated with the selected element identifier. For example, when the one or more of the plurality of source files include the selected element identifier, the indicator may be a graphical symbol. Optionally, the selected element identifier is highlighted in the GUI. Optionally, the selected element identifier is displayed in the GUI using an identified color.

In 520, the other processing unit optionally displays in the GUI the element documentation text in response to a user selecting the selected element identifier in the GUI. For example, the user may click the selected element identifier. Optionally, the user selects the selected element identifier by highlighting the selected element identifier.

Reference is now made also to FIG. 6, showing a flowchart schematically representing another optional flow of operations 600 for a graphical user interface, according to some embodiments. In such embodiments, in 601 the other processing unit 110 displays in the GUI the element documentation text. In 610, the other processing unit 110 optionally displays in the GUI at least a portion of another file of the plurality of source files in response to selecting a reference in the element documentation text, where the reference is a reference to a location in the other file.

Reference is now made again to FIG. 4B. In an example, in 501 the other processing unit 110 displays one or more of the plurality of source files including the class identifier 301B. In response to a user selecting the class identifier 301B in 520, in 601 the other processing unit 101 may display the element document text 400B in the GUI. In response to the user selecting the reference 410 to "301B" in file "new_classes", in 610 the other processing unit 110 optionally displays at least a portion of the file "new_classes".

Optionally, when the element documentation text comprises one or more text placeholders, in response to selecting in the GUI one of the one or more text placeholders the other processing unit 110 optionally provides in the GUI an interface for a user to insert additional text to the element documentation text, for example an editable text box.

Optionally, the other processing unit 110 provides the user with an interface in the GUI for modifying another part of the element documentation text, for example by displaying the other part of the element documentation text in another editable text box. Optionally, the other processing unit 110 provides the user with an interface in the GUI for selecting in the element documentation text one or more element identifiers for further documentation. Optionally, the other processing unit 110 provides the one or more element identifiers for further documentation to the processing unit 100 for the purpose of generating at least one additional element documentation text.

Optionally, in response to the user inserting the additional text, and additionally or alternatively modifying the element documentation text, the processing unit 110 updates the element documentation text in the repository of documentation text.

Optionally, the other processing unit 110 accesses storage 102 to retrieve the element documentation text.

Optionally, when the user inserts text into a source file, the other processing unit 110 identifies in the repository of documentation text at least one related element documentation text, related to the inserted text. For example, when the inserted text comprises a class identifier 301C that inherits from class identifier 301A, the other processing unit 110 may identify in the repository of documentation text a related element documentation text documenting class identifier 301A. Optionally, in response to the user inserting the inserted text, the processing unit 110 displays the related element documentation text in the GUI. Optionally, the at least one related element documentation text is identified according to a coding pattern identified in the inserted text. Optionally, the coding pattern is a pattern used to identify the plurality of element identifiers. Optionally, the at least one related documentation text comprises more than one usage instance of the plurality of usage instances. For example, when displaying the related element documentation text documenting class identifier 301A, the other processing unit 101 optionally displays not only references to example instance identified by class identifier 301B but also to another descendent of class identifier 301A, for example another usage instance identified by class identifier 301D or class identifier 301H.

In some embodiments described herewithin, system 100 executes a software development environment by executing the following method.

Reference is now made also to FIG. 7, showing a flowchart schematically representing an optional flow of operations 700 for a software development environment. In such embodiments, in 701 the other processing unit 110 displays at least one of the plurality of source files of the software program in a GUI, optionally on display device 115.

In 710, the other processing unit 110 optionally accesses a repository of documentation text associated with the plurality of source files. Optionally, the repository comprises one or more element documentation texts, documenting one or more element identifiers each identifying an element of the software program. Optionally, the one or more element documentation texts are generated using method 200.

Optionally in 720 the other processing unit 110 displays the one or more element documentation text in response to a user selecting the one or more element identifier in the GUI. Optionally, the other processing unit 110 displays the one or more element documentation text in response to the user adding the one or more element identifiers to a file displayed in the GUI, optionally before the file is update in a non-volatile storage, for example when the user adds to the file a new class identifier that inherits from the one or more element identifiers.

Optionally, the method 200 is implemented as part of a plugin for an integrated development environment. Additionally, or alternatively, the method 500 is implemented as part of the plugin for the integrated development environment. Additionally, or alternatively, the method 600 is implemented as part of the plugin for the integrated development environment.

To assist a user with generating element documentation text for an element identifier, in some embodiments system 100 implements the following optional method.

Reference is now made also to FIG. 8, showing a flowchart schematically representing an optional flow of operations 800 for user generated documentation. In such embodiments, in 801 the other processing unit 110 displays at least one of the plurality of source files of the software program in a GUI, optionally on display device 115.

Optionally, the other processing unit 110 provides the user with an interface in the GUI for selecting an element identifier. Optionally, in 810 the other processing unit 110 receives from the user a selection of the element identifier. The user selects the element identifier from a list comprising a plurality of element identifiers, where the plurality of element identifiers are optionally generated by the processing unit 101 using method 200. Optionally, the list of element identifiers from which the user selects the element identifier comprises at least one element identifier removed by the processing unit 101 from the plurality of element identifiers. Optionally, the user selects one of the at least one element identifier removed from the plurality of element identifiers.

In 815, the other processing unit 110 optionally displays a plurality of documentation primitives. Optionally, the plurality of documentation primitives comprises a plurality of usage instances and additionally or alternatively a plurality of patterns and additionally or alternatively a plurality of element identifiers, generated by the processing unit 101 using method 200. Optionally, when executing method 200, the processing unit 101 declines generating the element documentation text and declines adding the element documentation text to the repository. Optionally, the plurality of documentation primitives comprises one or more documentation templates.

Optionally, the other processing unit 110 provides the user with an interface in the GUI for selecting one or more of the plurality of documentation primitives. In 820 the other processing unit 110 optionally receives from the user a selection of the one or more documentation primitives. Optionally, the user selects the one or more documentation primitives without selecting an element identifier in 810, for example, when the one or more documentation primitives comprise a documentation template describing a global concept of the software program. In 830, the other processing unit 110 optionally generates an element documentation text for the element identifier selected in 810 using the one or more documentation primitives and optionally one or more other of the plurality of documentation primitives. For example, the one or more documentation primitives may include a documentation template. Optionally, the processing unit 110 generates the element documentation text using the documentation template and one or more usage patterns of the plurality of usage patterns of the plurality of documentation primitives.

Optionally, the processing unit 110 provides the user with a means for entering text. Optionally, in response to the user entering a text, the GUI provides the user with one or more suggestions to complete the text. Optionally, the one or more suggestions to complete the text comprise one or more element identifiers of the plurality of element identifiers. Optionally, the one or more suggestions comprise one or more text segments.

Optionally, the other processing unit 110 provides the user with an interface in the GUI for selecting and unselecting one or more parts of at least one documentation primitive of the plurality of documentation primitives. For example, when a documentation primitive is a documentation template, the other processing unit 110 may provide the user with an interface in the GUI for selecting one or more parts of the documentation template. Optionally, the one or more parts of a documentation primitive comprise an element identifier. Optionally, subject to the user unselecting a part of a documentation primitive, the other processing unit 110 declines adding a text, associated with the part of the documentation primitive, to the element documentation text. Optionally, subject to the user selecting another part of the documentation primitive, the other processing unit 110 adds another text, associated with the other part of the documentation primitive, to the element documentation text. For example, when the user unselects an element identifier, the other processing unit 110 may decline adding the element identifier to the element documentation text.

Optionally, the other processing unit 110 repeats method 800 in a plurality of documentation iterations. Optionally, in at least one of the plurality of documentation iterations, in 830 the other processing unit 110 updates, or re-generates, the element documentation text generated in a previous iteration of the plurality of documentation iterations. For example, in one or more of the plurality of documentation iterations the user may select a documentation template and the other processing unit 110 may update the element documentation text using the selected documentation template, such that the element documentation text is generated incrementally.

Optionally, the method 800 is implemented as part of the plugin for the integrated development environment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant element identifiers and documentation templates will be developed and the scope of the terms "element identifier" and "documentation template" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for generating documentation text, comprising:
    extracting, from a plurality of source files of a software program, a plurality of element identifiers, each identifying an element of the software program, wherein the plurality of element identifiers is a plurality of object-oriented-programming class identifiers (a plurality of class identifiers);
    selecting a set of selected element identifiers of the plurality of element identifiers according to a plurality of scores, each score computed for an element identifier of the plurality of element identifiers where the element identifier is a class identifier of the plurality of class identifiers, using at least one of: an amount of inheritance connections between the class identifier and the plurality of class identifiers, and an amount of derived classes derived from a base class of the plurality of classes identified by the class identifier; and
    for each selected element identifier of the set of selected element identifiers:
        generating an element documentation text using a documentation template and a plurality of patterns identified in a plurality of usage instances where in each of the plurality of usage instances the selected element identifier exists in at least one of the plurality of source files; and
        adding the element documentation text to a repository of documentation text associated with the plurality of source files.

2. The method of claim 1, wherein generating the element documentation text further comprises using an example instance selected from the plurality of usage instances.

3. The method of claim 2, wherein generating the element documentation text comprises inserting into the documentation template at least one reference to at least one location in the plurality of source files where the selected element identifier exists in the plurality of source files according to the example instance.

4. The method of claim 2, wherein the example instance is selected from the plurality of usage instances such that:
    the example instance has an amount of source code lines in the plurality of source files that is in a target code-size range;
    the example instance exists in an amount of patterns of the plurality of patterns that exceeds a pattern threshold value;
    the amount of patterns of the plurality of patterns in which the example instance exists is equal to or is greater than another amount of patterns of the plurality of patterns in which another of the plurality of usage instances exists; and
    each example pattern of the plurality of patterns in which the example instance exists applies to at least an identified usage amount of other usage instances of the plurality of usage instances.

5. The method of claim 1, wherein the plurality of source files is organized in a directory tree comprising a plurality of directories; and
    wherein the plurality of patterns includes at least one of:
        a percent of the plurality of usage instances that exist in a file of the plurality of source file that is stored in an identified directory of the directory tree,
        a percent of the plurality of usage instances that have a name comprising an identified prefix,
        a percent of the plurality of usage instances that have a name comprising an identified suffix,
        a percent of the plurality of usage instances having a reference in an identified file,
        a percent of the plurality of usage instances having a reference in an identified directory of the plurality of directories,
        a percent of the plurality of usage instances that reference an identified element identifier of the plurality of element identifiers, and
        a percent of the plurality of usage instances that have a member method having a name comprising the selected element identifier and another identified suffix.

6. The method of claim 1, wherein the plurality of source files is organized in a directory tree comprising a plurality of directories; and
    wherein each score is computed further using at least one of: a distance of a directory of the plurality of directories from a root directory of the directory tree, where the directory includes a file of the plurality of source files containing the element identifier, and an amount of files in a directory of the plurality of directories that do not contain the element identifier.

7. The method of claim 1, wherein generating the element documentation text comprises inserting into the documentation template at least one value computed according to the plurality of patterns.

8. The method of claim 7, wherein at least one of the at least one value is one of:
    a number;
    text extracted from one of the plurality of source files;
    a name of a file of the plurality of source files;
    a reference to a location in a file of the plurality of source files; and
    an element identifier of the plurality of element identifiers.

9. The method of claim 7, wherein the plurality of source files is organized in a directory tree comprising a plurality of directories; and
    wherein at least one of the at least one value is one of:
        a name of a directory of the directory tree; and
        a reference to a directory of the directory tree.

10. The method of claim 1, wherein the plurality of usage instances comprises a plurality of derived classes, each an object-oriented-programming class derived from a selected base class identified by the selected element identifier.

11. The method of claim 1, further comprising:
    identifying at least one inheritance graph according to a plurality of inheritance connections among the plurality of class identifiers; and wherein the score of the class identifier is computed further according to a distance of the class identifier from a root class identifier of an inheritance graph of the at least one inheritance graph that includes the class identifier.

12. The method of claim 11, further comprising:
before selecting the set of selected element identifiers removing from the plurality of element identifiers one or more of:
  a class identifier having an amount of appearances in the plurality of source files that exceeds an identifier-appearance threshold value;
  a class identifier identified as a test class, executed for the purpose of testing another of the plurality of class identifiers; and
  a mix-in class identifier, identifying an inherited class inheriting from an identified base class where a difference between the inherited class and the identified base class, computed using a class comparison function, is below a class-difference threshold.

13. The method of claim 11, further comprising:
identifying at least one additional element identifier of interest in one of the at least one inheritance graph, such that the one inheritance graph comprises the selected element identifier;
computing another plurality of patterns identified in another plurality of usage instances where in each of the other plurality of usage instances at least one of the at least one additional element identifier of interest exists in at least one of the plurality of source files; and
selecting an example instance from the other plurality of usage instances.

14. The method of claim 1, wherein the score of the element identifier is further computed according to at least one of: an amount of connections in the plurality of source files between the element identifier and the plurality of element identifiers, and an amount of appearances of the element identifier in the plurality of source files.

15. The method of claim 1, further comprising:
in a graphical user interface (GUI) that is displaying at least one of the plurality of source files:
displaying an indicator indicating that there is element documentation text associated with the selected element identifier; and
displaying the element documentation text in response to a user selecting the selected element identifier in the GUI.

16. The method of claim 15, further comprising:
displaying in the GUI at least a portion of another file of the plurality of source files in response to selecting a reference in the element documentation text, where the reference is a reference to a location in the other file.

17. The method of claim 15, wherein the GUI is part of a software development environment.

18. The method of claim 15, wherein the GUI is implemented in a web browsing application.

19. The method of claim 1, wherein adding the element documentation text to the repository of documentation text comprises adding the element documentation text to a document stored in the repository.

20. A system for generating documentation text, comprising at least one hardware processor configured for:
extracting, from a plurality of source files of a software program, a plurality of element identifiers, each identifying an element of the software program, wherein the plurality of element identifiers is a plurality of object-oriented-programming class identifiers (a plurality of class identifiers);
selecting a set of selected element identifiers of the plurality of element identifiers according to a plurality of scores, each score computed for an element identifier of the plurality of element identifiers where the element identifier is a class identifier of the plurality of class identifiers, using at least one of: an amount of inheritance connections between the class identifier and the plurality of class identifiers, and an amount of derived classes derived from a base class of the plurality of classes identified by the class identifier; and
for each selected element identifier of the set of selected element identifiers:
  generating an element documentation text using a documentation template and a plurality of patterns identified in a plurality of usage instances where in each of the plurality of usage instances the selected element identifier exists in at least one of the plurality of source files; and
  adding the element documentation text to a repository of documentation text associated with the plurality of source files.

21. A software program product for generating documentation text, comprising:
a non-transitory computer readable storage medium;
first program instructions for: extracting, from a plurality of source files of a software program, a plurality of element identifiers, each identifying an element of the software program, wherein the plurality of element identifiers is a plurality of object-oriented-programming class identifiers (a plurality of class identifiers);
second program instructions for: selecting a set of selected element identifiers of the plurality of element identifiers according to a plurality of scores, each score computed for an element identifier of the plurality of element identifiers where the element identifier is a class identifier of the plurality of class identifiers, using at least one of: an amount of inheritance connections between the class identifier and the plurality of class identifiers, and an amount of derived classes derived from a base class of the plurality of classes identified by the class identifier; and
third program instructions for: for each selected element identifier of the set of selected element identifiers: generating an element documentation text using a documentation template and a plurality of patterns identified in a plurality of usage instances where in each of the plurality of usage instances the selected element identifier exists in at least one of the plurality of source files; and adding the element documentation text to a repository of documentation text associated with the plurality of source files;
wherein the first, second, and third program instructions are executed by at least one computerized processor from the non-transitory computer readable storage medium.

22. A method for a software development environment, comprising:
displaying at least one of a plurality of source files of a software program in a graphical user interface (GUI) of the software development environment;
accessing a repository of documentation text associated with the plurality of source files, the repository comprising at least one element documentation text documenting at least one element identifier identifying an element of the software program; and displaying the at least one element documentation text in response to a user selecting the at least one element identifier in the GUI;

wherein the at least one element documentation text is generated by:

extracting, from a plurality of source files of a software program, a plurality of element identifiers, each identifying an element of the software program, wherein the plurality of element identifiers is a plurality of object-oriented-programming class identifiers (a plurality of class identifiers);

selecting a set of selected element identifiers of the plurality of element identifiers according to a plurality of scores, each score computed for an element identifier of the plurality of element identifiers where the element identifier is a class identifier of the plurality of class identifiers, using at least one of: an amount of inheritance connections between the class identifier and the plurality of class identifiers, and an amount of derived classes derived from a base class of the plurality of classes identified by the class identifier, and for each selected element identifier of the set of selected element identifiers:

generating an element documentation text using a documentation template and a plurality of patterns identified in a plurality of usage instances where in each of the plurality of usage instances the selected element identifier exists in at least one of the plurality of source files; and adding the element documentation text to a repository of documentation text associated with the plurality of source files.

* * * * *